Figure 1:
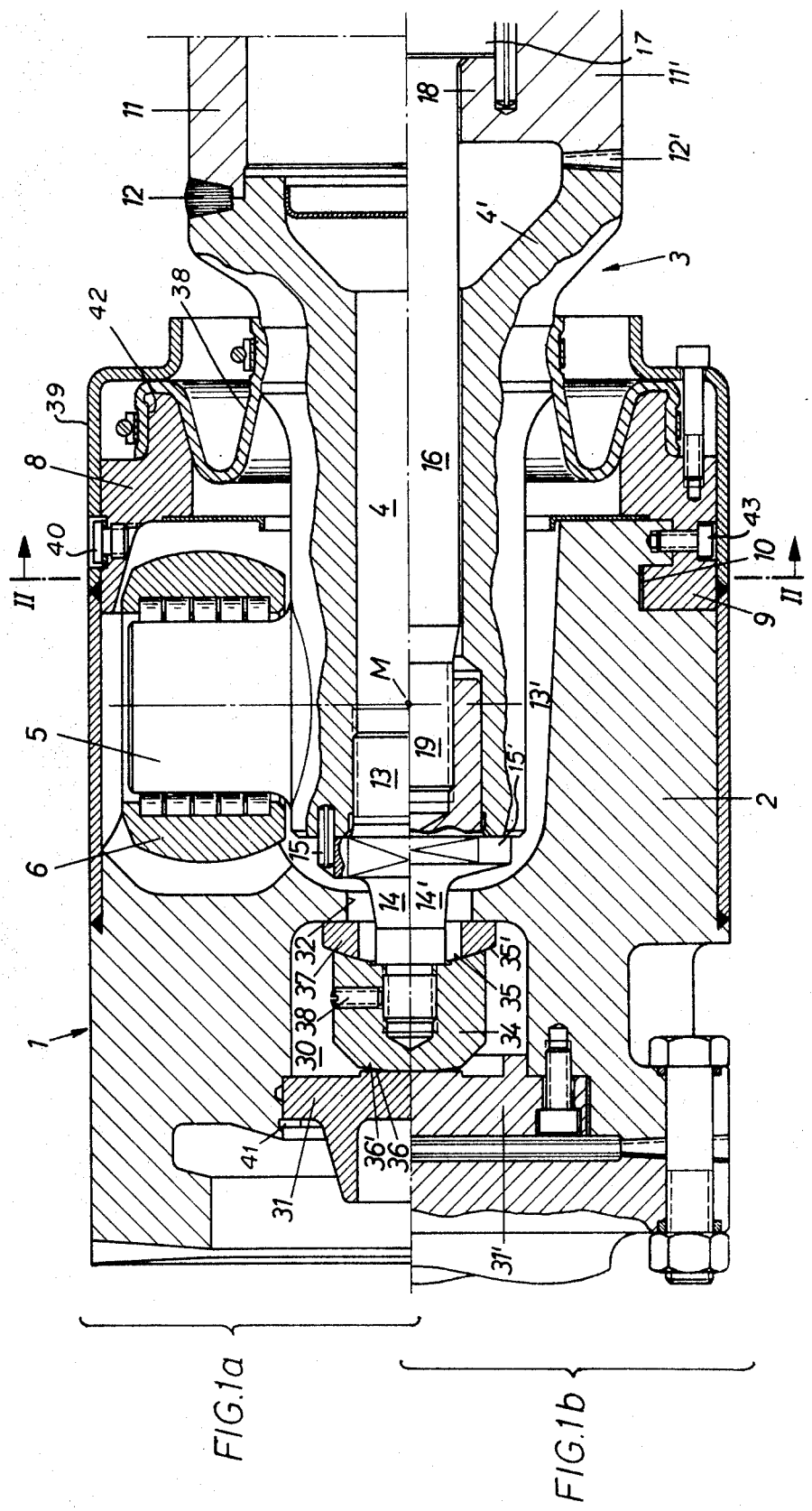

United States Patent

[11] 3,596,478

[72] Inventor Walter Komuzin
 Bottrop, Germany
[21] Appl. No. 6,506
[22] Filed Jan. 28, 1970
[45] Patented Aug. 3, 1971
[73] Assignee Gelenkwellenbau GmbH
 Essen, Germany
[32] Priority Jan. 31, 1969
[33] Germany
[31] G 69 03 751

[54] CONSTANT VELOCITY JOINT COUPLING
 7 Claims, 3 Drawing Figs.
[52] U.S. Cl. ............................................ 64/21
[51] Int. Cl. ........................................... F16d 3/30
[50] Field of Search .............................. 64/8, 21

[56] References Cited
 UNITED STATES PATENTS
 2,615,317 10/1952 Rzeppa ........................ 64/21
 3,452,558 7/1969 Cull et al. ..................... 64/21

Primary Examiner—Edward G. Favors
Attorneys—Curt M. Avery, Arthur E. Wilfond, Herbert L. Lerner and Daniel J. Tick ABSTRACT: Constant velocity joint coupling includes one joint half-formed with a plurality of axially parallel concave race surfaces defining a number of cylindrical spaces therebetween; and another joint half-including a hub having at least three arbors extending radially in stellate form therefrom, and a spherically convex roller-shaped joint member rotatably and axially displaceably mounted on each of the arbors, the joint members being received respectively in the cylindrical spaces, the hub having a free end formed with a spherically convex axial bearing surface having a center of curvature located at the point of intersection of the longitudinal axis of the hub and the axes of the joint members, and the one joint half being formed with a support bearing surface cooperatively engaging the axial bearing surface.

CONSTANT VELOCITY JOINT COUPLING

My invention relates to constant velocity joint coupling and more particularly to such coupling having one joint half with at least three stubs or arbors extending radially in stellate form from a hub, a spherically convex roller-shaped joint member being rotatably and axially displaceably mounted on the respective stubs, and another joint half having axially parallel concave race surfaces defining a number of cylindrical spaces therebetween in which the joint members are respectively received. Such a joint coupling usually affords mutual relative displacement of the two joint halves.

When using such couplings in some situations, the necessity has arisen for bracing the two joint halves of the coupling axially with respect to one another while, however, still retaining the displaceability or mobility of the bending angle and the constant velocity or synchronism of the joint halves.

It is accordingly an object of my invention to provide constant velocity joint coupling wherein the joint halves are braced axially relative to one another while maintaining displaceability or mobility of the bending angle of the joint and the constant velocity or synchronism of the joint halves.

With the foregoing and other objects in view, I provide, in accordance with my invention, constant velocity joint coupling comprising a pair of joint halves, one of the joint halves being formed with a plurality of axially parallel concave race surfaces defining a number of cylindrical spaces therebetween; and the other of the joint halves including a hub having at least three arbors extending radially in stellate form therefrom, and a spherically convex roller-shaped joint member rotatably and axially displaceably mounted on each of the arbors, the joint members being received respectively in the cylindrical spaces, the hub having a free end formed with a spherically convex axial bearing surface having a center of curvature located at the point of intersection of the longitudinal axis of the hub and the axes of the joint members, and the one joint half being formed with a support bearing surface cooperatively engaging the axial bearing surface.

With a constant velocity joint coupling of such construction, axial relative movements of the joint halves are avoided yet, while maintaining the constant velocity or synchronism of the joint halves as heretofore, displaceability or mobility of the bending angle of the both joint halves relative to one another is ensured. Such a joint coupling is employed advantageously for upright or vertically disposed structure wherein the upper joint half is braced or supported by the axial bearing surface at the lower joint half.

If the axial forces to be absorbed by the joint coupling are comparatively small, in accordance with a further feature of my invention, the support bearing surface cooperatively engaging the convex axial bearing surface of the other joint half has a flat or planar construction.

In accordance with another feature of the invention, the support bearing surface cooperatively engaging the convex axial bearing surface is formed at the inner end face of a central cover sealingly secured at the side of the one joint half to which the shaft associated with that one joint half is attachable. The cover thus sealingly closes off the interior of the joint from the exterior so that both the joint members and the race surfaces as well as the axial bearing surfaces are able to be lubricated in common with the same lubricating means such as grease or the like.

In accordance with a further advantageous feature of my invention, I provide at the free end of the hub facing the point of intersection of the longitudinal axis of the hub and the axes of the joint members, an annular spherically concave axial bearing surface having a radius of curvature equal to the distance of that axial bearing surface from the intersection point, and the one joint half is provided with a spherically convex support bearing surface having substantially the same radius of curvature as the axial bearing surface and cooperatively engaging the latter. With this construction, axial relative displacements of the joint halves in opposite directions are prevented.

In accordance with still another feature of the invention, the axial bearing surfaces are formed on a bearing head secured on an extension of the hub resembling a shaft stub, the bearing head being received with clearance between the support bearing surfaces formed at the one joint half. Clearance is necessary because, when the joint halves are bent with respect to one another, a given central displacement can occur which can cause binding or jamming between the joint halves if no clearance were provided.

Other features which are considered as characteristic for the invention are set forth in the appended claims.

Although the invention is illustrated and described herein as embodied in constant velocity joint coupling, it is nevertheless not intended to be limited to the details shown, since various modifications and structural changes may be made therein without departing from the spirit of the invention and within the scope and range of equivalents of the claims.

Figure 2:
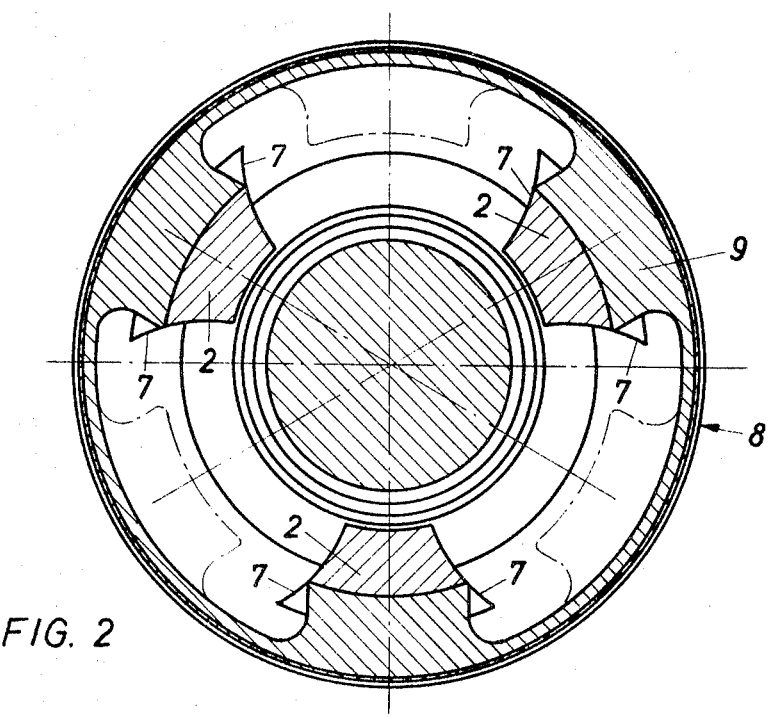

The construction and method of operation of the invention, however, together with additional objects and advantages thereof will be best understood from the following description of specific embodiments when read in connection with the accompanying drawings, in which:

FIGS. 1a and 1b are longitudinal half sections of two different embodiments of the joint halves of a coupling constructed in accordance with my invention; and FIG. 2 is a cross-sectional view taken along the lines II–II in FIGS. 1a and 1b.

Referring now to the drawings, there is shown in both embodiments of FIGS. 1a and 1b a joint coupling constructed in accordance with my invention having one joint half 1 provided with three arms 2 that are spaced at equal intervals of 120° about the periphery of the one joint half 1 and another joint half 3 formed of a hub 4 (FIG. 1a), 4' (FIG. 1b) and three radially extending stubs or arbors 5, also peripherally spaced at equal intervals of 120° on which joint members 6 are rotatably and longitudinally displaceably mounted, respectively. The arms 2 are formed with arcuate lateral faces 7 which extend in the axial direction of the arms 2. Respective lateral faces 7 of the arms 2 located adjacent one another in the peripheral direction of the joint half 1 are disposed opposite one another and define therebetween a cylindrical space extending parallel to the axis of the joint half 1. Thus, the respective lateral faces 7 of the adjacent arms 2 may be considered as being disposed on common axially extending surface of a cylinder. The joint members 6 are spherically curved like the cylinder surface defined by the lateral faces 7 of the adjacent arms 2, the radius of curvature of the surface of the joint members 6 being the same as the radius of curvature of the cylindrical space defined by the lateral faces 7 of the adjacent arms 2, each of the joint members 6 being accordingly accommodated between the lateral faces 7 of adjacent arms 2. Because of this arrangement, the two joint halves 1 and 3 are displaceable angularly and longitudinally relative to one another.

For further description of constant velocity joint couplings of this general type, reference may be had to the copending application of H. J. Kleinschmidt et al. Serial No. 887,158, filed on or about Dec. 22, 1969, and assigned to the same assignee as that of the instant application.

The arms 2 are enclosed at the free ends thereof by a ring 8 which, at an end thereof directed toward the joint members 6, is provided with three radially inwardly extending projectors 9 spaced at equal intervals of 120° about the periphery of the ring 8. The width of each of the projections 9 corresponds substantially to the dimension of the arms 2 measured in peripheral direction of the joint half 1, nd the thickness of the projections 9 corresponds substantially to the width of a peripheral groove 10 formed in the joint half 1 and extending across the arms 2 thereof.

To assemble the ring with the joint halves, the ring 8 is disposed with the projections 9 thereof in the position shown in phantom in FIG. 2, between the arms 2 of the joint half 1 and is then pushed forwardly toward the joint half 1, i.e. the left-hand side of FIGS. 1a and 1b until the projections 9 are in alignment with the annular groove 10. The ring 8 is then rotated relative to the joint half 1 so that the projections 9 are angularly displaced from the phantom position thereof to the solid line position 9 thereof shown in FIG. 2, wherein the projections 9 are each received in respective portions of the annular groove 10 provided in the arms 2, thereby forming a bayonetlike joint therewith. After the ring 8 has been rotated into the solid line position thereof shown in FIG. 2, it is secured against rotation relative to the arms 2 by tightening a setscrew 43 which binds the ring 8 to the joint half 1. At an end of the ring 8 directed away from the joint members 6, the ring 8 is reduced in diameter in order to provide a support surface 42 for the radially outer end of a flexible roll diaphragm 38, the inner end of the roll diaphragm being fastened to the hub 4. One end of a sleevelike covering 39 is fastened by screws 40 to the outer peripheral surface of the ring 8, and covers the arms 2 and the spaces therebetween, the other end of the sleevelike covering 39, as viewed from the free ends of the arms 2, is seated on a peripheral surface portion of the joint half 1 located at the base of the arms 2. Further details of the construction of the constant velocity joint coupling may be obtained by referring to the aforementioned copending application.

The hub 4 is welded at 12, in the embodiment of FIG. 1a, to the shaft 11 associated therewith. The hub 4 is hollow and is provided at the open end thereof at the left-hand side of FIG. 1a with an internal thread in which an externally threaded end 13 of a shaft stub 14 is screwed so as to provide an extension of the hub 4. The shaft stub 14 is centered with respect to the hub 4 by a slotted or splined pin 15.

In the embodiment of FIG. 1b, the hollow hub 4' is connected to the shaft 11', associated therewith, by means of intermeshing radial serrations or teeth 12', formed on the end faces thereof, and a through-bolt 16 having at the right-hand end thereof, as shown in FIG. 1b, a shoulder portion 17 bearing on the rear face of a flange 18 formed on the shaft 11' and carrying the respective teeth 12'. At the end 19 of the through-bolts 16, an external thread is formed, which meshes with an internal thread provided in a hollow end 13' of a shaft stub 14' forming an extension of the hub 4'. The shaft stub 14' is provided with a flange 15' through which it is in abutting engagement with and braced against the end face at the open end of the hub 4' wherein the end 13' is fittingly received. Obviously, it is also within the scope of my invention to provide a hub and shaft stub of one-piece construction.

In the one joint half 1 there is formed, in the portion thereof extending away from the arms 2, a central cavity 30 having an opening 32 at the right-hand side thereof, as viewed in FIGS. 1a and 1b. The shaft stub 14, 14' projects with marked clearance through the opening 32 into the cavity 30. A bearing head 34 threadedly secured to the free end of the shaft stub 14, 14', and fastened by a setscrew 38, is received in the central cavity 30. A cover 31, 31' sealingly closes the cavity 30 at the left-hand side thereof, as viewed in FIGS. 1a and 1b. The cover 31 of the embodiment of FIG. 1a, secured by a circlip or snap ring 41, is provided, at the side thereof facing away from the cavity 30, with a suitable centering device such as is required for the attachment of a spring lock or rapid closure coupling. The cover 31' in the embodiment of FIG. 1b is of flat or planar construction and is sealingly bolted to the joint half 1.

At the side thereof facing the opening 32 of the central aperture 30, the bearing head 34 is formed with a spherical concave bearing surface 35 and, at the side of the bearing head 34 facing the cover 31, 31', the bearing head is formed with a spherical convex bearing surface 36. The center of curvature of the bearing surfaces 35 and 36 is located at the point of intersection M of the longitudinal axis of the hub 4, 4' and the axes of the joint members 6 so that the radii of curvature of the surfaces 35 and 36 corresponds to the distances respectively therefrom along the axes of the hub 4 to the point M. The bearing surface 35 cooperatively engages an annular support bearing surface 35' formed on a ring 37 and disposed coaxially to the opening 32, the ring 37 being secured by any suitable means to the inner wall surface of the cavity 30 at the right-hand side thereof, as shown in FIGS. 1a and 1b.

The spherical convex bearing surface 36 cooperatively engages a flat or planar support bearing surface 36' formed at the base of the cover 31, 31'.

Clearance is provided between the bearing surfaces 35 and 35', on the one hand, and 36, 36', on the other hand, in order to accommodate any displacement of the hub 4 that may arise during use of the joint due to bending thereof. The one joint half 1 is thereby reliably supported or braced on two sides of the other joint half 3 for all possible bending angles of the coupling halves.

I claim:

1. Constant velocity joint coupling comprising a pair of joint halves, one of said joint halves being formed with a plurality of axially parallel concave race surfaces defining a number of cylindrical spaces therebetween; and the other of said joint halves including a hub having at least three arbors extending radially in stellate form therefrom, and a spherically convex roller-shaped joint member rotatably and axially displaceably mounted on each of said arbors, said joint members being received respectively in said cylindrical spaces, said hub having a free end formed with a spherically convex axial bearing surface having a center of curvature located at the point of intersection of the longitudinal axis of said hub and the axes of said joint members, and said one joint half being formed with a support bearing surface cooperatively engaging said axial bearing surface.

2. Coupling according to claim 1 wherein said support bearing surface is planar.

3. Coupling according to claim 1 wherein said support bearing surface is formed on an inner end face of a central cover sealingly secured to a side of the one joint half at which a shaft associated with said joint half is attachable.

4. Coupling according to claim 1, including an annular spherically concave axial bearing surface formed at the free end of said hub facing said center of curvature and having a radius of curvature equal to the distance from said concave axial bearing surface to said center of curvature, and further including a spherically convex support bearing surface, having substantially the same radius of curvature of said concave axial bearing surface, formed on said one joint half and cooperatively engaging said concave axial bearing surface.

5. Coupling according to claim 4, including a shaft stub member extending from said hub, said convex and concave axial bearing surfaces being formed on a bearing head secured to said shaft stub member, said bearing head being fittingly received with clearance between said support bearing surfaces formed on said one joint half.

6. Coupling according to claim 5 wherein said one joint half is formed with a cavity having an opening through which said shaft stub member extends into said cavity, and including a ring secured to a transverse wall of said one joint half and disposed coaxially to said opening, said convex support bearing surface being formed on said ring.

7. Coupling according to claim 5 wherein said bearing head is threadedly secured to said shaft stub member.